United States Patent
Kuehn et al.

(10) Patent No.: US 10,706,823 B2
(45) Date of Patent: Jul. 7, 2020

(54) DEVICE FOR DISPLAYING INFORMATION IN MOTOR VEHICLES

(71) Applicant: Bayerische Motoren Werke Aktiengesellschaft, Munich (DE)

(72) Inventors: Victor Kuehn, Munich (DE); Sebastian Kroes, Munich (DE); Julia De Bono, Karlsfeld (DE); Marcel Ottmann, Lochhofen (DE); Henri Freiherr Von Freyberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/005,164

(22) Filed: Jun. 11, 2018

(65) Prior Publication Data

US 2018/0293964 A1 Oct. 11, 2018

Related U.S. Application Data

(63) Continuation of application No. PCT/EP2016/078438, filed on Nov. 22, 2016.

(30) Foreign Application Priority Data

Dec. 11, 2015 (DE) .................. 10 2015 224 942

(51) Int. Cl.
*G09G 5/38* (2006.01)
*B60K 35/00* (2006.01)
(Continued)

(52) U.S. Cl.
CPC .............. *G09G 5/38* (2013.01); *B60K 35/00* (2013.01); *B60K 37/00* (2013.01);
(Continued)

(58) Field of Classification Search
CPC .. G09G 5/38; G09G 2354/00; G09G 2380/10; G09G 2320/10; G01C 21/3661;
(Continued)

(56) References Cited

U.S. PATENT DOCUMENTS

2007/0182718 A1    8/2007   Schoener et al.
2009/0047197 A1    2/2009   Browne et al.
(Continued)

FOREIGN PATENT DOCUMENTS

DE    23 31 160 A1    1/1975
DE    103 24 579 A1    12/2004
(Continued)

OTHER PUBLICATIONS

International Search Report (PCT/ISA/210) issued in PCT Application No. PCT/EP2016/078438 dated Feb. 9, 2017 with English translation (four (4) pages).

(Continued)

*Primary Examiner* — Andrew Sasinowski
(74) *Attorney, Agent, or Firm* — Crowell & Moring LLP

(57) ABSTRACT

An instrument panel for motor vehicles includes an information device which is configured to display information visible at various locations on the instrument panel for the driver of the motor vehicle. The information device is made up of a plurality of mechanical information elements which are movable independently of one another and are distributed over the instrument panel. The information elements are movable on a surface of the instrument panel and are arranged in such a way that in a first position the information elements project beyond the surface of the instrument panel and in a second position the information elements terminate substantially flush with the surface of the instrument panel.

13 Claims, 4 Drawing Sheets

(51) Int. Cl.
*B60K 37/00* (2006.01)
*G01C 21/36* (2006.01)
*B60R 13/02* (2006.01)

(52) U.S. Cl.
CPC ...... *B60R 13/0256* (2013.01); *G01C 21/3632* (2013.01); *G01C 21/3661* (2013.01); *B60K 2370/158* (2019.05); *B60K 2370/1531* (2019.05); *B60K 2370/16* (2019.05); *B60K 2370/188* (2019.05); *B60K 2370/193* (2019.05); *B60K 2370/194* (2019.05); *B60K 2370/334* (2019.05); *B60K 2370/52* (2019.05); *B60R 2013/0287* (2013.01); *G01C 21/3688* (2013.01); *G09G 2320/10* (2013.01); *G09G 2354/00* (2013.01); *G09G 2380/10* (2013.01)

(58) Field of Classification Search
CPC ............ G01C 21/3632; G01C 21/3688; B60R 13/0256; B60R 2013/0287; B60K 37/00; B60K 35/00; B60K 2370/158; B60K 2370/193; B60K 2370/1531; B60K 2370/188; B60K 2370/334; B60K 2370/16; B60K 2370/52
See application file for complete search history.

(56) References Cited

U.S. PATENT DOCUMENTS

| | | | | |
|---|---|---|---|---|
| 2011/0285618 | A1* | 11/2011 | Browne | ................. B60K 37/06 345/156 |
| 2011/0316681 | A1 | 12/2011 | Rousseau | |
| 2014/0176350 | A1* | 6/2014 | Niehsen | ............... B62D 15/025 340/988 |
| 2015/0123469 | A1* | 5/2015 | Lange | ...................... G09G 5/00 307/10.1 |
| 2015/0169077 | A1* | 6/2015 | Lee | ........................ B60K 35/00 345/184 |
| 2015/0367729 | A1* | 12/2015 | Oda | ........................ B60K 35/00 701/36 |

FOREIGN PATENT DOCUMENTS

| | | |
|---|---|---|
| DE | 10 2007 045 932 A1 | 4/2009 |
| DE | 10 2011 104 951 A1 | 3/2012 |
| DE | 10 2010 041 961 A1 | 4/2012 |
| DE | 10 2012 005 855 A1 | 9/2013 |
| EP | 1 195 300 A1 | 4/2002 |
| WO | WO 2004/091994 A1 | 10/2004 |

OTHER PUBLICATIONS

German-language Written Opinion (PCT/ISA/237) issued in PCT Application No. PCT/EP2016/078438 dated Feb. 9, 2017 (five (5) pages).

German-language Search Report issued in counterpart German Application No. 102015224942.5 dated Aug. 23, 2016 with partial English translation (thirteen (13) pages).

* cited by examiner

DEVICE FOR DISPLAYING INFORMATION IN MOTOR VEHICLES

CROSS REFERENCE TO RELATED APPLICATIONS

This application is a continuation of PCT International Application No. PCT/EP2016/078438, filed Nov. 22, 2016, which claims priority under 35 U.S.C. § 119 from German Patent Application No. 10 2015 224 942.5, filed Dec. 11, 2015, the entire disclosures of which are herein expressly incorporated by reference.

BACKGROUND AND SUMMARY OF THE INVENTION

The invention relates to devices for motor vehicles for displaying information, and corresponding methods.

Nowadays, vehicles normally include an instrument panel in the front area of the interior, which is used to accommodate displays, air vents and the operating units of electronic devices, in order to increase the safety of the occupants in the event of an accident and to form an aesthetic finish. The displays accommodated by instrument panels are normally formed by round analog instruments, LCD or LED displays, and are used to display information that is essential to driving, such as the speed of travel, but also to display navigation routes and navigation information or multimedia contents. These displays are usually arranged in the field of view of the driver and normally occupy a small part of the instrument panel.

The document EP 1 195 300 A1 describes a device for the central display of functions in a vehicle, wherein these functions, in addition to vehicle-based functions, contain the navigation function, with a display arranged in the driver's field of view, on which data belonging to the functions can be displayed, a movable cursor on the display and an operating element that can be actuated by the driver, with which the data displayed on the display can be selected by appropriate movement of the cursor, wherein a navigation device is connected via a converter to a communication network containing the display and the operating element, and the navigation dialog menu displayed on the display is operable by the operating element. The disadvantage with this generic configuration of an instrument panel according to current use is that large areas of the instrument panel are not used to display information for the driver. Therefore, large areas in the field of view of the driver remain unused.

The invention is therefore based on the object of making unused areas of the instrument panel available for imparting information to the driver.

The object is achieved by the device and the method in accordance with embodiments of the invention.

A first aspect of the invention relates to an instrument panel for motor vehicles, comprising: an information device which is configured to display information at various locations on the instrument panel so as to be visible for the driver of the motor vehicle; wherein the information device is constructed from a multiplicity of information elements that are movable mechanically independently of one another and are arranged in distributed fashion over the instrument panel; wherein the information elements are movable and arranged on a surface of the instrument panel in such a way that, in a first position, they project above the surface of the instrument panel and, in a second position, end substantially flush with the surface of the instrument panel. Herein, the instrument panel is understood to mean the casing (with possibly special surface) by which displays, air vents and/or operating units of electronic devices are accommodated and fixed in the front area of the interior of vehicles. The information elements thus arranged "retractably". In this way, the information elements fit into the surface of the instrument panel if they are not being used to display information. If they are being used for display, they stand out above the surface and are thus visible to the driver (and other occupants). In particular, undulations represented by the information elements, presentation of all elements or transverse movements are conceivable as information.

Herein, it is therefore proposed to display information on the instrument panel (that is to say on the surface of the instrument panel) by way of information elements which present themselves. The invention thus advantageously uses the extent of the instrument panel, which normally goes over the entire width of the interior of the vehicle, and the arrangement of the same in the visible range of the driver in order to display information. This type of display makes perception in the range of peripheral vision and without identification and processing of (artificial) symbols, pictograms or text possible. In this way, intuitive information can be achieved by movements or simply presenting the information elements. The reaction time of the driver to the information decreases and inundation with information to be processed is prevented. At the same time, the information device provides only limited display possibilities in comparison with a display comprising a high-resolution dot matrix, which simplifies the "vocabulary" of the information possibilities and simplifies the reception and learning by the driver.

In one exemplary embodiment, each information element comprises a visible element and a motor actuating element, optionally a stamp connecting the two elements. The the actuating element is preferably a linear electrical actuating motor.

In one advantageous configuration, the invention is embedded in a device for motor vehicles for displaying information, comprising: the instrument panel and a control device for motor vehicles; wherein the control device is configured to do the following: receive information specifications which are in particular relevant to the vehicle guidance and result in particular from the position of the vehicle, the position of the vehicle relative to the roadway, relative to the driving lane and/or the position of road users in the surroundings of the vehicle; determine the display location on the instrument panel by using the information specifications; cause the display of an item of information on the instrument panel at the determined display location.

The information specification can in particular comprise location information, which describes location in the surroundings of the vehicle and, for example, has been determined by means of a surroundings detection system of the vehicle. On the other hand, the information specification can also comprise navigation information and relate to the fact that a driving maneuver is to be executed, for example the information specification can relate to a street into which it is necessary to turn or merely represent the indications "right" or "left". The information specification can likewise be information with regard to the course of an ideal line (ideal driving lane) which the vehicle is to follow. The information specification can likewise comprise a warning. The information specification normally relates to information which is relevant to the vehicle management and results from the position of the vehicle, the position of the vehicle relative to the roadway or driving lane and/or the position of road users in the surroundings of the vehicle.

For safety reasons, no objects should be stored on the upper side of the instrument panel when the vehicle is moving. This region has hitherto rarely been used for functional purposes. With the aid of the device according to the invention, this region is put into use and the utilization of space and area in the interior of the vehicle is increased. At the same time, other display systems present in the vehicle, such as HUDs (head-up displays), can be relieved of the display of the content transported by the information. As a result, complex displays are avoided and the speed of perception by the driver is improved, which promotes traffic safety.

Advantageously, the information is structured simply and generously and, because of its form, also comprehensibly when perceived in the peripheral field of view. Likewise, by means of its position on the instrument panel and possibly its movement, the information advantageously transports important information for the vehicle management, which can also be detected from the peripheral field of view. The driver therefore does not have to remove his gaze from the surroundings, in particular the street, in order to be able to perceive the content transported in the information. This promotes traffic safety.

Advantageously, the information device is arranged on the upper side of the instrument panel (that is to say on the possibly curved surface which is arranged opposite the windshield) and, for aesthetic reasons, is let into the latter. The upper side of the instrument panel is normally located in the peripheral range of view of the driver (that is to say not in the region of most acute vision). The information itself is therefore typically formed as a relatively large structure, the circumference of which is, for example, more than 10 cm, 20 cm or 50 cm, which can also be perceived easily in the peripheral range of view.

In one development, the information device is configured to display information in a coherent information region, namely a region on the instrument panel in which information can be displayed substantially at any location or at regularly spaced locations, in particular with spacings of less than 10 cm, 5 cm, 2 cm or 1 cm.

The information device can thus display information "flatly". In this way, the aforementioned relatively large structures are made possible. At the same time, the entire width of the instrument panel or a major part of the width (for example more than 50%, 60%, 70% or 80%) can be used to display information. The two-dimensional formation makes it possible for the display of the information on the instrument panel to be subjected to fewer restrictions than if, for example, only a few discrete display locations (for example three or four display locations at a spacing of 50 cm) are provided on the instrument panel. It is made possible to produce for the driver a relationship between the display location on the instrument panel and the location in the surroundings.

Herein, movable is understood to mean the capability of rotation and/or translation. In this variant, the information is generated by the movement of the information elements and displayed to the driver. As compared to an expression by an electronic display without movable elements, the use of movable information elements permits a display which projects out of the surface of the instrument panel (which herein is also understood to mean a display on the instrument panel). This can offer advantages for the driver of the vehicle in the perception of the information, for example since reflections on the surface of an electronic display can be avoided.

Typically, the information elements each have a surface which has the same material, the same color and/or the same texture as the surface of the instrument panel. This surface of the information elements is used to hide the information elements as far as possible for the user. This surface of the information elements can be arranged in such a way that, when the information elements end flush with the surface, this surface of the information elements continues the surface of the instrument panel. In this position, the information elements are not used to display the information.

Furthermore, the information elements can each have at least one further surface which differs in the material, in the color and/or in the texture from the surface of the instrument panel; wherein the surface of the instrument panel consists substantially of a material, has a color and a texture. The aim here is that the driver detects this surface, if it is visible to him, and that it stands out from the surface of the instrument panel. In the position of the information element in which the surface is visible to the driver, the information element is used to display the information.

Provision can be made for the information device to be used to display warnings. In the case of mechanically movable information elements, provision can be made in the event of a warning for all or some information elements to assume positions which is used to display information. In other words: the information elements "line up", which can in particular take place suddenly.

In addition to the mechanical display of the information, the information device can also comprise an electronic display. The display can in particular be an LCD, LED or OLED display, or comprise an electronic projector for images; wherein the projector is configured to project images onto the instrument panel. The projector could be arranged in the headlining of the vehicle (and above the instrument panel) and project the images from there onto the surface of the instrument panel, optionally in temporal and local synchronization with the information reproduction (or the reproduction of part of the information) by the information elements. The images displayed by the display or the projector comprise the information or part thereof. Both parts together result in the overall information. The use of an electronic display or a projector brings the advantage that the images displayed are substantially freely programmable in color and form.

The invention can be used to inform the driver about a location in the surroundings. To this end, the information specification comprises a reference to a location in the surroundings of the vehicle (location information). A relationship is produced between the location in the surroundings of the vehicle and a location on the instrument panel, which may be helpful for the driver in perceiving the surroundings. The display location on the instrument panel is then determined in such a way that the information appears to the driver of a vehicle substantially in the same direction as the direction in which the location described by the location information lies. Here, the term "direction" is to be understood to mean the radial direction from the driver outward, which is typically specified in degrees (360° represent the complete revolution). In height, the information is naturally different from the height in which the location appears to the driver in the surroundings. The information panel is typically located underneath the windshield, through which the driver looks and perceives the corresponding location in the surroundings. For the driver, the information appears in the direction in which the corresponding location of the location information also lies. The information is typically only arranged somewhat lower in the view of the driver than the location in the surroundings (for example another road user).

Although no so-called contact analog display is achieved by the invention (overlaying the location to be marked by the information), an intensive reference of the information to the location in the surroundings of the vehicle is made possible. The driver can interpret the information intuitively. An attention conduit to the location in the surroundings is achieved. As compared with a contact analogy, the present invention offers the advantage that there is no danger that the location viewed (for example another road user) is hidden by a contact-analog display.

In a further development, the control device is configured to determine a plurality of display locations on the instrument panel one after another by using the information specification (and to cause the display of the information at these locations one after another), in such a way that the information for the driver appears to move. The information can be determined in such a way that it "runs" from one end of the instrument panel or a central region in front of the driver to the other or one (for example the left-hand or right-hand) end. For example, a driving instruction to turn right can be displayed by the information running to the right. In the event that individual mechanically movable elements are used, a swarming movement of the elements can be provided.

The use of a movement brings the great advantage that movements in the peripheral field of view are perceived very well. Typically, the instrument panel of a vehicle is located in the peripheral field of view of the driver. Thus, without the surroundings being hidden, the driver is made aware of the information to be communicated by the moving information on the instrument panel. This permits particularly rapid perception of information and possibly critical traffic situations, and thus increases traffic safety.

If the information specification relates to a location in the surroundings, provision can also be made for the information to move as far as a location on the instrument panel which is located in the direction like the direction in which the described location lies. In this way, the gaze of the driver is led intuitively to the location to be viewed (which is represented in the location information).

In one embodiment of the invention, the location information represents navigation information, in particular information about driving maneuvers. In these cases, it is not necessary for any relationship to exist between a concrete location in the surroundings of the vehicle and the location of the display of the information on the instrument panel. The information display on the instrument panel can have a symbolic character and be determined by an association between display location and navigation information. As a result of the association, moving information can also be provided. For example, a request to turn to the right or left can be implemented by a display of the information on the right-hand or left-hand edge of the instrument panel. In an advantageous embodiment, the information moves to the left or right on the instrument panel.

Another aspect of the invention relates to a method for displaying information in motor vehicles, comprising: receiving location information with respect to the surroundings of a vehicle; determining the display location of information on the instrument panel or the device for displaying information (of the motor vehicle) by using the location information; causing the display of the information on the instrument panel at the determined display location by means of an information device; wherein the information device is configured to display information at various locations on the instrument panel so as to be visible for the driver of the vehicle. The method can be executed by a control device of the vehicle and supplemented by the aspects already listed above. A control device can be an electronic computing device, for example an ECU or CPU. In some implementations, the control device can be implemented as part software in a larger software complex, wherein the part software executes the above method when executed by an electronic computing unit.

Other objects, advantages and novel features of the present invention will become apparent from the following detailed description of one or more preferred embodiments when considered in conjunction with the accompanying drawings.

BRIEF DESCRIPTION OF THE DRAWINGS

The same designations refer to corresponding elements across the figures.

DETAILED DESCRIPTION OF THE DRAWINGS

Figure 1:
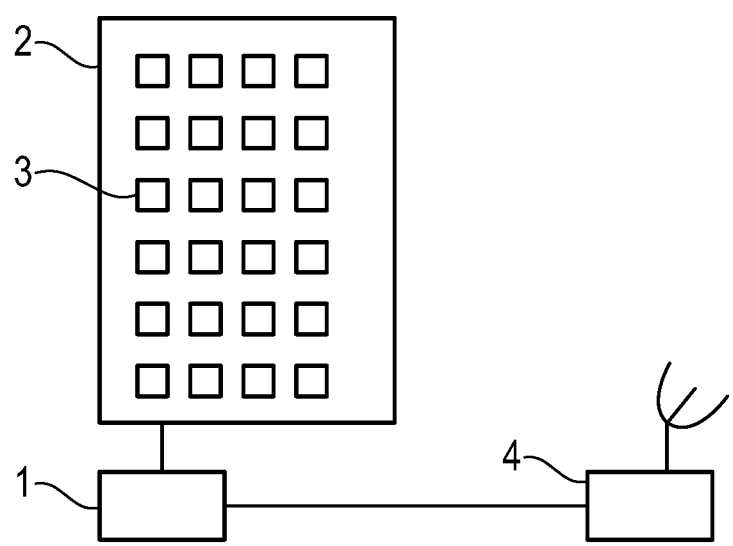
FIG. 1 shows, schematically, the structure of a device for displaying information according to one exemplary embodiment.

FIG. 1 shows, schematically, the structure of a device for displaying information according to one exemplary embodiment. A vehicle (not illustrated) includes a control device 1, which is configured to execute a method according to the invention. The steering wheel (see FIGS. 2A, 2B) is designated by the reference number 5. Furthermore, the vehicle has an instrument panel 2, into which individual mechanical and movable information elements 3 are let. The vehicle also includes a navigation unit with satellite navigation 4, which is used to determine the position of the vehicle and future driving maneuvers. The navigation unit 4 generates location information on the basis of the detected position and calculated route, specifically an item of information as to the point at which information is to be displayed on the instrument panel.

Figure 2A:
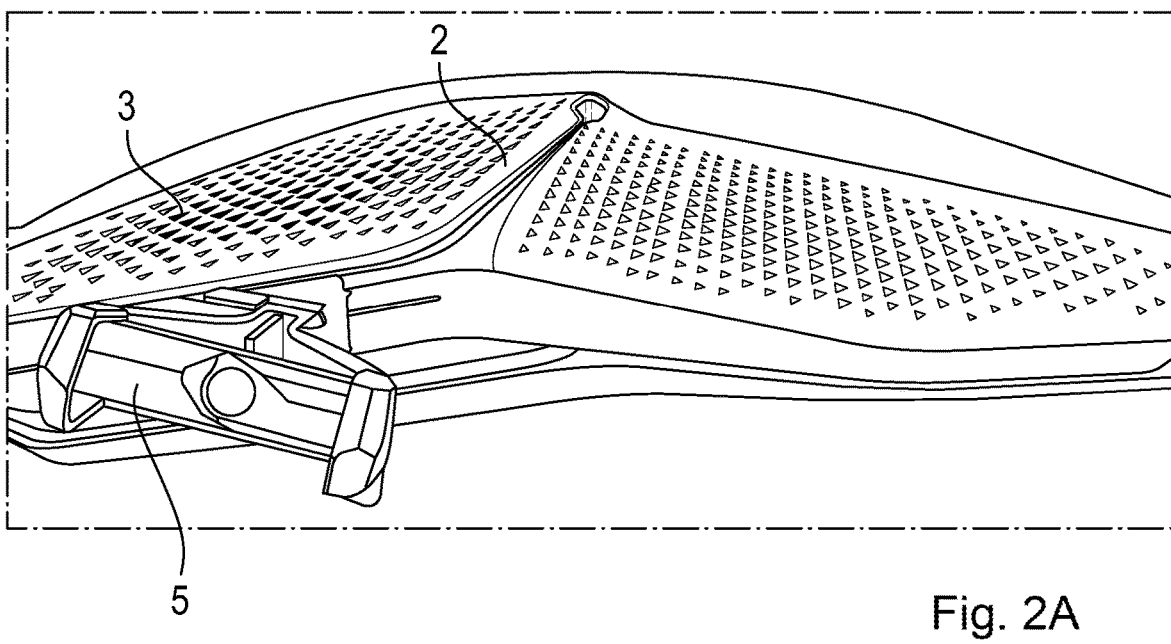
FIGS. 2A and 2B show, schematically, the view of the interior of a vehicle during operation of the device for displaying information according to the exemplary embodiment of FIG. 1.
Figure 2B:
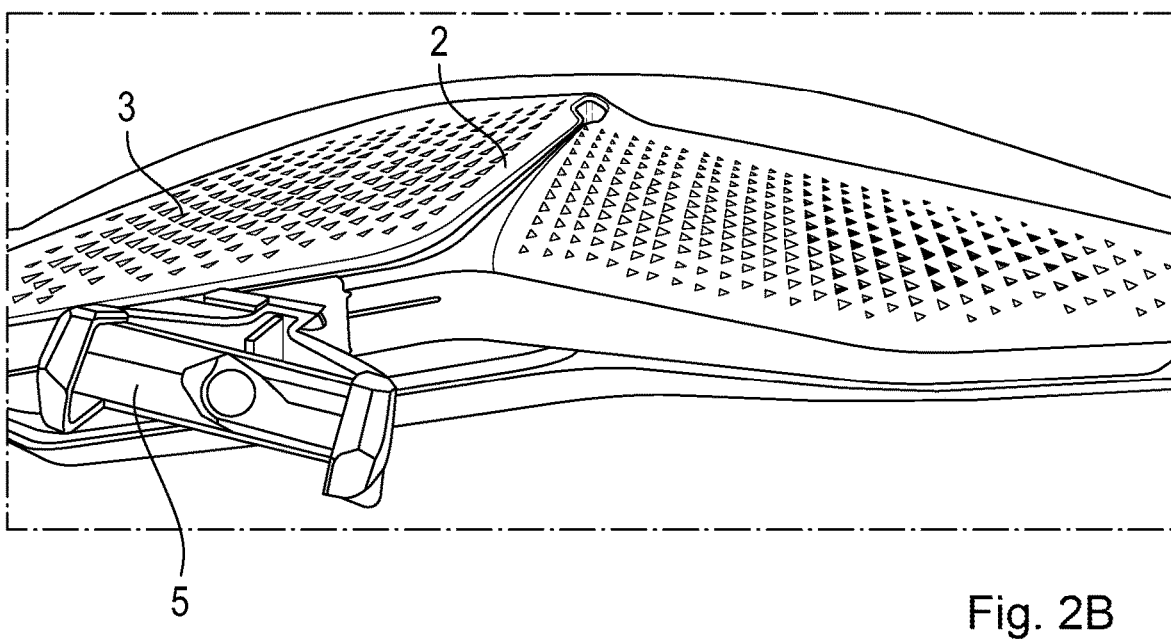

FIGS. 2A and 2B show, schematically, the view of the interior of a vehicle during operation of the device for displaying information according to the exemplary embodiment of FIG. 1. FIGS. 2A and 2B show an instrument panel 2, which extends over the complete width of the interior underneath the windshield (not illustrated) of a vehicle. The instrument panel comprises in the center an edge which, within the context of the invention, does not fulfill any function. Arranged in the instrument panel is the information device, which extends virtually over the entire width of the instrument panel 2 and which, in the present case, comprises a plurality (for example 800) of small information elements 3. The plurality of information elements form an information area. The information elements 3 themselves are rotatably fixed at one of their edges in such a way that, in a first ("folded-in") position, they end flush with the surface of the instrument panel 2. For this purpose, the information elements 3 have on their upper side a surface which fits into the surface of the instrument panel 2. This surface of the information elements has the same material, the same color and texture as the surface of the instrument panel.

On one or both of their front sides, the information elements have a different color than the surface of the instrument panel, for example red. In a second ("folded-up") position, these end faces are visible to the driver (and other occupants) of the vehicle. In the folded-in position, they are not visible.

The information elements 3 are individually rotatable. If an information element 3 is moved into the second position, it is visible to the driver and becomes part of the information which is displayed to the driver. Typically, multiple information elements 3 are activated jointly and multiple information elements 3 in the second position jointly result in an item of information. Furthermore, the elements 3 forming the information are typically located beside one another.

In the present example of FIGS. 2A and 2B, it is shown how navigation information is presented to the driver. The navigation unit 4 sends the information specification to the control unit 1 that information relating to turning right is to be displayed. According to an assignment stored in the control unit 1, it is detected that an item of information running to the right or, expressed in another way, a wave to the right, is to be displayed. The wave starts on the left-hand edge of the instrument panel 2 (FIG. 2A) and runs over the instrument panel 2 to the right (FIG. 2B), crossing over the edge of the instrument panel. The control unit 1 activates the individual information elements one after another over the wave period in this case, so that they are firstly raised (that is to say appear out of the surface and the front side becomes visible) and then lowered (and once more end flush with the surface).

This gives the driver of the vehicle intuitively understandable information that a turn to the right is to be made in order to follow the travel route. At the same time, the running information constitutes a movement at least partly in the peripheral field of view of the driver, which can be detected easily and quickly by the latter.

Figure 3:
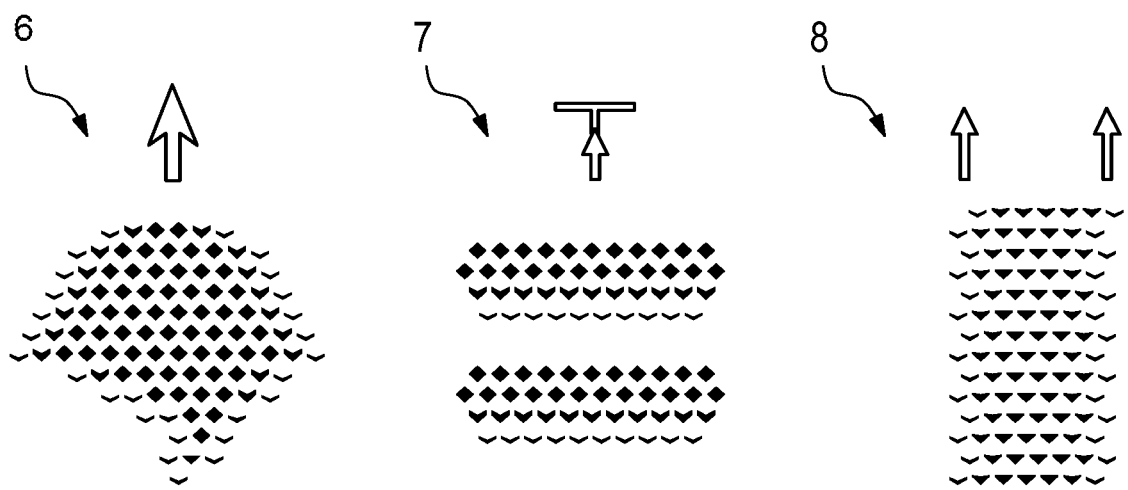
FIG. 3 illustrates further information which can be displayed by the device for displaying information according to one exemplary embodiment.

FIG. 3 illustrates three further items of information which can be displayed by the device for displaying information according to one exemplary embodiment. The control device receives corresponding information specifications and displays the information, the location and shape of which is read from a stored assignment, on the instrument panel 2 in front of the position of the driver (in front of the steering wheel 5).

It is possible for information 6 relating to acceleration, information 7 relating to braking and information 8 relating to rolling to be presented as driving instructions. The information is illustrated in animated form, which is indicated by the arrows above the information.

By means of the display of symbolic, simply structured and moving information in the peripheral field of view of the driver, the latter can pick up and implement the content contained in the information without having to divert his gaze from the surroundings. In this way, traffic safety is promoted.

Figure 4:
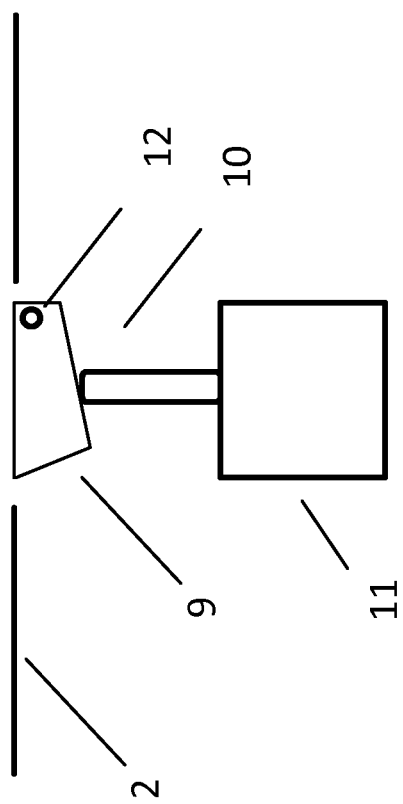
FIG. 4 shows the basic structure of an information element according to one exemplary embodiment.

FIG. 4 shows the basic structure of an information element according to one exemplary embodiment. The visible element 9, which is connected to the electrical linear actuating motor 11 by way of a rod 10, ends flush with the dashboard 2. When the information element is intended to be activated, that is to say is intended to serve for displaying an item of information and to project beyond the surface of the instrument panel, the actuating motor 11 is actuated by the control device for this purpose. Said actuating motor 11 moves the rod 10 in the direction of the surface of the instrument panel, as a result of which the visible element 9 rotates around the axis of rotation 12. The front of the visible element 9 then projects beyond the surface of the dashboard and is visible to the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An instrument panel for a motor vehicle, comprising:
   an information device configured to display information at various locations on an upper side of the instrument panel so as to be visible for a driver of the motor vehicle,
   wherein the information device comprises a plurality of information elements that are mechanically movable independently of one another and are arranged in a distributed fashion over the upper side of the instrument panel,
   wherein the information elements are movable and arranged on a surface of the upper side of the instrument panel such that, in a first position, they project above the surface of the upper side of the instrument panel and, in a second position, they end substantially flush with the surface of the instrument panel, and
   wherein the information elements collectively display the information via the respective movement of the information elements between the first position and the second position.

2. The instrument panel as claimed in claim 1, wherein each information element comprises a visible element and a motor actuating element.

3. The instrument panel as claimed in claim 2, wherein the motor actuating element is a linear electrical actuating motor.

4. The instrument panel as claimed in claim 1, wherein the information elements each have a surface which has a same material, a same color and/or a same texture as the surface of the upper side of the instrument panel, the information elements each have at least one further surface which differs in the material, in the color and/or in the texture from the surface of the upper side of the instrument panel, and the surface of the upper side of the instrument panel is made substantially of a material, has a color and a texture.

5. The instrument panel as claimed in claim 1, wherein the information device further comprises an electronic display.

6. The instrument panel as claimed in claim 5, wherein the electronic display is one of an LCD, LED or OLED display.

7. The instrument panel as claimed in claim 5, wherein the electronic display is an electronic projector for images, wherein the projector is configured to project images onto the instrument panel.

8. A device for a motor vehicle for displaying information, comprising:
   an instrument panel as claimed in claim 1;
   a control device for the motor vehicle, wherein the control device is configured to:
   receive information specifications which are relevant to vehicle management and result from a position of the vehicle, a position of the vehicle relative to a roadway, relative to a driving lane and/or a position of road users in surroundings of the vehicle, determine a display location on the upper side of the instrument panel by using said information specifications, and cause the display of an item of information on the upper side of the instrument panel at the determined display location.

9. The device as claimed in claim 8, wherein the information specification comprises location information with respect to a location in the surroundings of the vehicle, the display location on the upper side of the instrument panel is determined such that the information appears to a driver of a vehicle substantially in the same direction as the direction in which the location described by the location information lies.

10. The device as claimed in claim 9, wherein the control device is further configured to:

determine a plurality of display locations on the upper side of the instrument panel one after another by using the information specification, such that the information for the driver appears to move.

11. The device as claimed in claim 10, wherein the information for the driver appears to move such that, when the driver follows the information with his gaze, it leads the gaze of the driver in the direction like the direction in which the location described by the location information lies.

12. The device as claimed in claim 8, wherein the information specification comprises navigation information about a driving maneuver, and the display location on the upper side of the instrument panel is determined by using an association between the navigation information and a display location.

13. A method for displaying information in a motor vehicle, the method comprising the steps of:

receiving information specifications;

determining a display location of information on an upper side of an instrument panel by using the information specifications, said instrument panel comprising:

an information device configured to display information at various locations on the upper side of the instrument panel so as to be visible for a driver of the motor vehicle, wherein the information device comprises a plurality of information elements that are mechanically movable independently of one another and are arranged in a distributed fashion over the upper side of the instrument panel, wherein the information elements are movable and arranged on a surface of the upper side of the instrument panel such that, in a first position, they project above the surface of the upper side of the instrument panel and, in a second position, they end substantially flush with the surface of the upper side of the instrument panel;

causing the information elements to collectively display of the information on the upper side of the instrument panel at the determined display location via the movement respective movement of the information elements between the first position and the second position, wherein the information device is configured to display the information at various locations on the upper side of the instrument panel so as to be visible for the driver of the vehicle.

\* \* \* \* \*